Patented Feb. 13, 1951

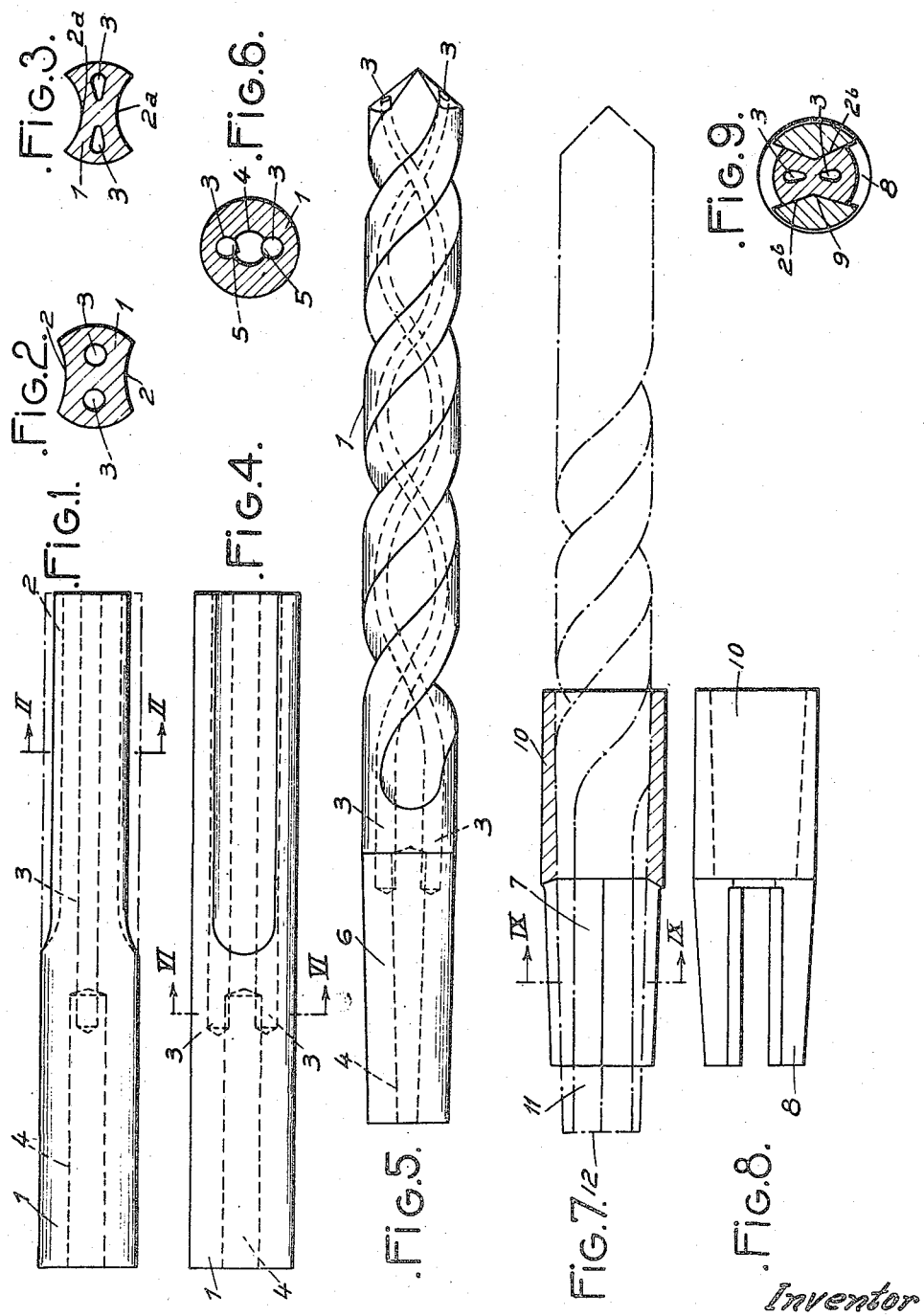

2,541,849

UNITED STATES PATENT OFFICE 2,541,849

PROCESS FOR MANUFACTURING HOLLOW TOOLS

Louis Jean Albert Villeneuve, Paris, France

Application August 8, 1947, Serial No. 767,473
In France October 5, 1946

7 Claims. (Cl. 76—108)

It has often been suggested to form within the body of a tool canals designed to open at the active end of the tool near the cutting edge and through which a fluid is circulated under pressure to cool the cutting zone, lubrify it when necessary or ensure a permanent evacuation of the chips.

When the tool under consideration is a twist-drill, the canals are formed in the body of the drill before the latter is given a twist so as to be provided with the desired shape. Heretofore, because the cross-sectional area of the profiled blank is very small, the bore diameter of the canals also was very small and required very great care on the part of the workman entrusted with this operation, as well as considerable time, and the brittleness of small diameter drills resulted in an enormous waste of material.

Moreover, drills thus manufactured were made from a cylindrical blank of forged metal and the helical contour was obtained by milling the flutes, then twisting the blank.

The new process for manufacturing twist-drills according to this invention has for its object to provide a remedy for those various drawbacks.

According to the invention, manufacture of hollow twist drills is effected from a forged blank formed merely with two grooves of small depth extending over part of the length of the blank or throughout the length thereof. The fluid-circulating canals are drilled with a sufficient diameter in a direction parallel to the longitudinal axis of said blank.

After said canals have been drilled, the outer grooves of the blank are forged again to increase their depth and bring the blank to the requisite final dimensions. In this operation, the section of the inner canals is squeezed, but remains free and sufficiently large to ensure proper circulation of the fluid. Subsequently to the above operations, the blank is drawn and twisted, then passed to the finishing and sharpening operations as normally performed in the manufacture of such tools. The seal with respect to the hollow tool-driving and pressure-fluid feeding chuck may, according to one embodiment be effected as follows:

The forged grooves are only formed over part of the length of the tool so as to leave at the suitable end of the latter a cylindrical portion, in which an axial bore will subsequently be drilled, the diameter of which is sufficient for said bore to open laterally into the two blind bores previously mentioned. A conical taper formed by forging on said end will permit of securing the drill in its chuck, the taper imparted to the axial bore remaining without any influence. This taper will, at the same time, ensure tightness between the drill and the chuck and proper behaviour during work.

In another embodiment of drills manufactured according to the above process, the forged grooves are formed throughout the length of the blank. The portion provided for securing the drill in the chuck is not subjected to twisting, and therefore the canals and the grooves remain straight in this portion. The grooves are milled according to a predetermined angular profile, and the outer surface of the blank is turned to a conical taper. On the drill thus prepared, there is adapted a member the outer profile of which is conical and the inner profile of which is correlated with the profile of the part of the blank prepared as just described, said profile also being slightly conical. In this manner, tightness is obtained between the pressure-fluid distributing chuck and the intermediate conical member, and also between said intermediate member and the drill itself, the whole structure being driven, on one hand, by the pressure of the chuck on the external conical surface of the intermediate member, and on the other hand, by the interpenetration of the angular profiles.

The ensuing disclosure made in reference with the accompanying drawings given by way of illustration and not of limitation will clearly show in what way the invention may be performed.

Fig. 1 shows in plan view one embodiment of the blank.

Fig. 2 is a cross-section on line II—II of Fig. 1.

Fig. 3 is a cross-section on line II—II of Fig. 1, but illustrating the blank after the grooves have been forged.

Fig. 4 is a plan view corresponding to Fig. 1.

Fig. 5 is a view of a finished drill.

Fig. 6 is an explanatory diagram of the bore shown in section on line VI—VI of Fig. 4.

Fig. 7 shows in elevation and partly in cross-section another embodiment of the finished drill.

Fig. 8 is a side view of a sealing bushing.

Fig. 9 is a section on line IX—IX of Fig. 7.

As clearly shown in Fig. 1, a blank 1 is formed by forging with grooves 2 of comparatively small depth. Blind holes 3 are formed in a direction parallel to the longitudinal axis of the blank, and a single bore 4, of a diameter greater than the bores 3 and intersecting the two latter ones so as to provide communications 5 between all three of said bores, as clearly shown in Fig. 6, is drilled in the part of the blank in which the grooves 2 are not formed.

The bores 3 and 4 are of relatively large diameter, large enough to ensure that no difficulty is encountered in the formation thereof, thus eliminating any loss of time and the waste generally encountered in the formation of small diameter bores by means of long and thin and therefore very brittle drills. Moreover, the diameters of said bores allow of normal working conditions without requiring either great care or considerable time because of the low rate of feed.

The blank as shown in Fig. 2, which includes grooves 2 of small depth, is reforged so as to impart to the grooves indicated at 2a a much greater depth. During this forging step, the bores 3 assume an ovalised shape but their total sectional area still remains large enough to enable the fluid to pass. After this forging step, the blank is brought to the final blank dimensions. It is then subjected to drawing and twisting steps necessary to impart thereto the shape of a twist-drill blank as shown in Fig. 3, the cylindrical shank 6 being initially left untouched, during the drawing and twisting steps, then being reforged so as to assume a slightly conical taper with a view to its introduction into a chuck driving the tool and supplying a fluid under pressure through the canals 4 and 3. During this latter forging operation, the bore 4 also assumes a slight taper.

At that time, the drill blank thus finished may be brought to the turning, milling and sharpening finishing operations, all performed according to standard practice.

A forged drill for internal fluid circulation is thus provided, offering numerous advantages in use. The resistance of this forged drill is greater than that of drills milled from a round blank because of the improved distribution of the metal fibres. Such a drill therefore appears to be more durable and is adapted to resist greater strains.

In addition, the fluid supplied at the level of the cutting edges enables active lubrication and cooling of the latter during operation. Said cutting edges will therefore be very durable and the loss of time incurred by frequent sharpening of the tool will be reduced. Moreover, an active circulation of oil within the body of the tool makes it possible to maintain the latter at a temperature of use below a pre-determined limit, thus avoiding accidental overheating effective to destroy the heat treatment of the constituent steel.

Another advantage provided by this process for manufacturing resides in that the bores 3 are made by means of drills of large cross-section and therefore, in the course of the successive forging, rolling and twisting steps, there is no danger of having said bores obstructed. There will therefore be no waste from this cause.

The fluid-feeding chucks may also be adapted for supply of compressed air in the event of lubrication of the cutting edges being unnecessary, for instance in the drilling of metals such as cast iron or non-ferrous metals; this supply of air not only has the advantage of cooling the drill but also facilitates evacuation of the chips and reduces the loss of time required by frequent recurrent attacks of the bore and successive retractions of the drill.

Another embodiment of such a drill is shown in Figs. 7, 8 and 9.

In this case, the original blank is a rolled blank in which grooves 2 have ben formed throughout the length of the blank. Similarly, the bores 3 go through and through, the bore 4 being omitted. The forging finishing operations remain the same as in the previously disclosed instance, and only the finishing operations for the shank 6 differ by the following points:

The grooves 2a are formed by milling to an angular shape 2b as clearly shown in Fig. 9. The part 7 of the drill shank is not subjected to twisting, and the bores 3 in this zone remain straight. A sealing bushing 8, presenting a complementary inner profile 9, is driven over the shank of the drill. Said bushing 8 has a slightly tapered external surface 10 to engage in the driving and fluid-feeding chuck. The drill itself projects as at 11 from said bushing, and the bores 3 normally open into the inner space of the chuck, at the level of the upper end face 13 of the drill as indicated in dots and dashes. The combination of the slightly tapered profiles 2b and 9 provides for tightness between the drill and the bushing, while the tapered surface 10 provides for tightness between the bushing and the chuck.

The above arrangement has the advantage of enabling the mounting upon a single chuck of drills of different diameters, on which bushing are adapted having a uniform outer profile 10. Moreover, by means of this arrangement, the drill blanks may advantageously be manufactured by rolling a continuous bar.

It is obvious that without exceeding the scope of the invention, alterations may be made in the above described forms of embodiment, and in particular the sealing bushing may be formed with a cylindrical outer surface without any flats, like in standard series of cylindrical shank drills.

What I claim as my invention and desire to secure by Letters Patent is:

1. A process for manufacturing drills, comprising, in succession, the steps of forging a cylindrical blank so as to form therein two shallow grooves over a limited length of its external cylindrical surface, of drilling two canals of relatively large diameter in the bulged parts of said blank comprised between said grooves, parallelly to said longitudinal axis, of forging said drilled blank to bring said grooves to their final dimensions, of drawing said forged drilled blank, of twisting that portion of the blank formed with grooves to shape it to its helicoidal form, of centrally drilling that cylindrical portion of said blank remaining non-twisted to unite said canals, of forging said cylindrical portion to a slightly conical shape, of finishing said drill and of sharpening the operative end thereof.

2. A process for manufacturing drills comprising, in succession, the steps of forging a cylindrical blank so as to form therein two shallow grooves over a limited length of its external cylindrical surface, of drilling two canals of relatively large diameter in the bulged parts of said blank comprised between said grooves, parallelly to said longitudinal axis, of forging said drilled blank to bring said grooves to their final dimensions, of drawing said forged drilled blank, of twisting that portion of the blank formed with grooves to shape it to its helicoidal form, of centrally drilling said cylindrical portion of the blank remained non-twisted to a diameter such that the central canal thus obtained intersects said first two canals, of forging said cylindrical portion to a slightly conical shape, of finishing 3. A process for manufacturing drills, comprising, in succession, the steps of rolling a cylindrical blank to form therein two relatively shallow grooves on its external cylindrical surface, of drilling two canals of relatively large diameter throughout the length of said blank, said canals being situated in the bulged parts of said blank comprised between said grooves, of rolling said drilled blank to bring said grooves to their final dimensions, of drawing said rolled drilled blank, of twisting a certain length of said blank formed with grooves to shape it to the helicoidal form of said drill, of milling the rectilineal portion of said blank to bring it to a shape enabling the mounting of said blank, of ensuring a tight connection between said canals and the driving and pressure fluid feeding chuck receiving said drill, of finishing said drill and of sharpening the operative end thereof.

4. A process for manufacturing drills comprising, in succession, the steps of rolling a cylindrical blank to form therein two relatively shallow grooves on its external cylindrical surface, of drilling two canals of relatively large diameter throughout the length of said blank, said canals being situated in the bulged parts of said blank comprised between said grooves, of rolling said drilled blank to bring said grooves to their final dimensions, of drawing said rolled drilled blank, of twisting a certain length of said blank formed with grooves to shape it to the helicoidal form of said drill, of milling the grooves in the rectilineal portion of said blank to impart thereto an angular profile, of inserting the shank end of said drill through a sealing bushing formed with an interior profile complementary to said angular profile, of finishing said drill and of sharpening the operative end thereof.

5. A process for manufacturing drills having a tapered shank comprising, in succession, the steps of rolling a cylindrical blank to form therein two relatively shallow grooves on its external cylindrical surface, of drilling two canals of relatively large diameter throughout the length of said blank, said canals being situated in the bulged parts of said blank comprised between said grooves, of rolling said drilled blank to bring said grooves to their final dimensions, of drawing said rolled drilled blank, of twisting a certain length of said blank formed with grooves to shape it to the helicoidal form of said drill, of milling the grooves in the rectilineal portion of said blank to impart thereto an angular profile, of inserting the shank end of said drill through a sealing bushing formed with an interior profile complementary to said angular profile and having a tapered outer profile, of finishing said drill and of sharpening the operative end thereof.

6. A process for manufacturing drills having a cylindrical shank comprising, in succession, the steps of rolling a cylindrical blank to form therein two relatively shallow grooves on its external cylindrical surface, of drilling two canals of relatively large diameter throughout the length of said blank, said canals being situated in the bulged parts of said blank comprised between said grooves, of rolling said drilled blank to bring said grooves to their final dimensions, of drawing said rolled drilled blank, of twisting a certain length of said blank formed with grooves to shape it to the helicoidal form of said drill, of milling the grooves in the rectilineal portion of said blank to impart thereto an angular profile, of inserting the shank end of said drill through a sealing bushing formed with an interior profile complementary to said angular profile and having a cylindrical outer profile, of finishing said drill and of sharpening the operative end thereof.

7. A process for manufacturing drills, comprising, in succession, the steps of forging a cylindrical blank so as to form therein two shallow grooves over a length at least equal to a limited length of its external cylindrical surface, of drilling two canals of relatively large diameter in the bulged parts of said blank comprised between said grooves, parallelly to the longitudinal axis thereof, of forging said drilled blank to bring said grooves to their final dimensions, of drawing said forged drilled blank, of twisting said drawn blank to shape it to its helicoidal form, of ensuring a tight connection between said canals and the driving and pressure fluid feeding chuck receiving said drill, of finishing said drill and of sharpening the operative end thereof.

LOUIS JEAN ALBERT VILLENEUVE.

REFERENCES CITED

The following references are of record in the file of this patent:

UNITED STATES PATENTS

| Number | Name | Date |
|---|---|---|
| 234,362 | Williams | Nov. 9, 1880 |
| 331,739 | Stetson | Dec. 1, 1885 |
| 432,636 | Moore | July 22, 1890 |
| 589,576 | Rickey | Sept. 7, 1897 |
| 1,208,164 | Kelly | Dec. 12, 1916 |
| 1,285,589 | Barnes | Nov. 26, 1918 |
| 1,409,753 | Moore | Mar. 14, 1922 |
| 2,148,805 | Cogsdill | Feb. 28, 1939 |
| 2,314,189 | Andreasson | Mar. 16, 1943 |
| 2,325,973 | Nurnberger et al. | Aug. 3, 1943 |
| 2,348,874 | Andreasson | May 16, 1944 |
| 2,360,385 | Anderson | Oct. 17, 1944 |
| 2,405,298 | Fleischer | Aug. 6, 1946 |